UNITED STATES PATENT OFFICE.

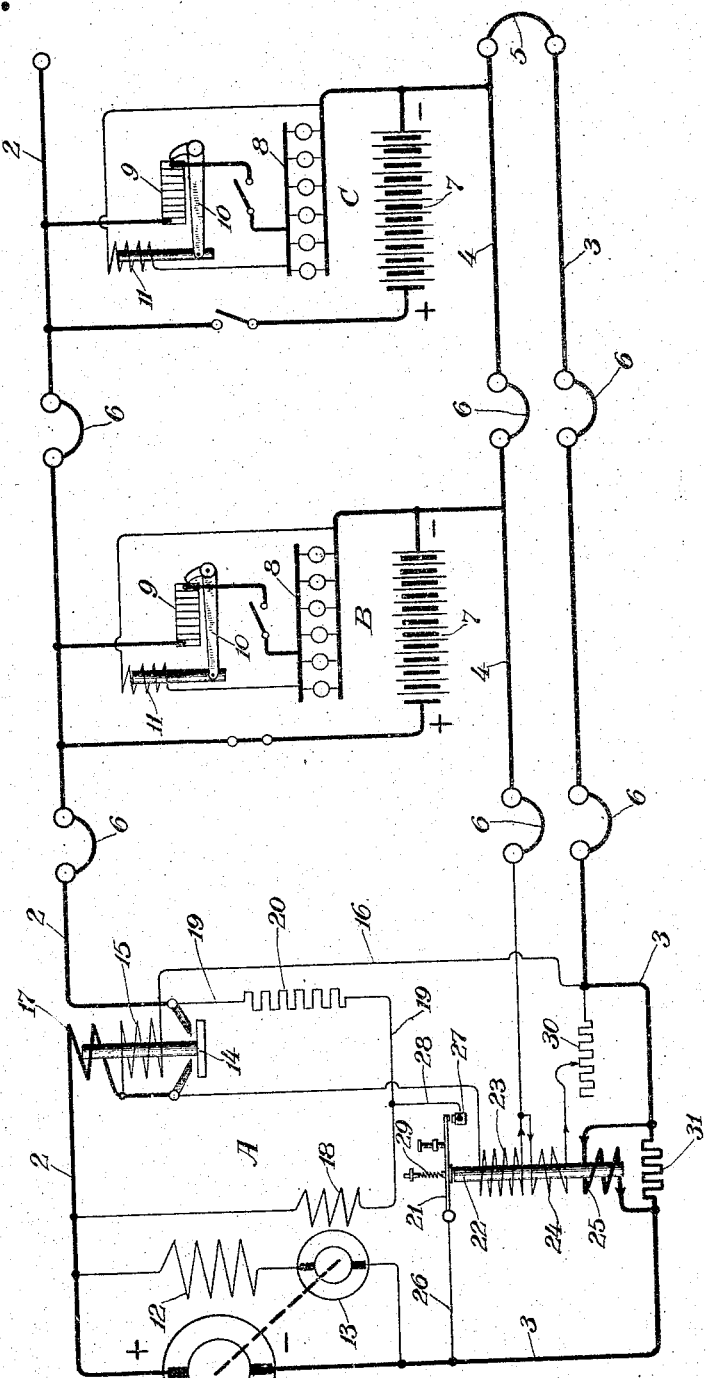

WILLIAM A. TURBAYNE, OF LANCASTER, NEW YORK, ASSIGNOR TO GOULD COUPLER COMPANY, A CORPORATION OF NEW YORK.

ELECTRICAL SYSTEM OF DISTRIBUTION.

991,114.  Specification of Letters Patent.  Patented May 2, 1911.

Application filed November 5, 1909. Serial No. 526,340.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and more especially to train lighting systems in which automatic means are used to regulate the voltage of the generator and keep it at a proper value.

One object of my invention is to provide a system in which the generator voltage is automatically regulated and varied so that it will produce a proper voltage when more train units and work circuits are added to the train to be fed by the generator.

A further object of my invention is to provide a system having the advantages above pointed out and in which the voltage of the system is regulated so as not to be affected by the characteristics of the driven machines.

Further objects, features and advantages will more clearly appear from the detailed description given below taken in connection with the accompanying drawing which forms a part of this specification and which shows diagrammatically a system embodying one form of my invention.

Referring to the drawing, 1 represents a main generator which may be driven by the movement of the train, as from a car axle, or which may be driven at a substantially constant speed by any suitable prime mover. The generator 1 supplies the main conductors 2, 3, and 4, the conductors 3 and 4 forming a loop conductor by being connected at 5. The connection between the various train units is indicated by the connectors 6. As shown, the generator 1 is placed on the train unit designated A, while the conductors 2, 3 and 4 extend through the train units B and C. On each of the train units B and C are placed storage batteries 7 connected across the conductors 2 and 4. Also connected across the conductors 2 and 4 on these train units are work circuits 8 and in series with each work circuit is a carbon pile 9 arranged to be controlled by a lever 10 and solenoid 11, the coil of the solenoid 11 being connected directly across the work circuit 8, so that it will be responsive to voltage changes of the work circuit.

The main generator 1 is provided with a shunt field 12 and in series therewith is placed an auxiliary dynamo 13 arranged on the same shaft with the generator 1 and so wound that it normally opposes the action of the field 12. In series in the conductor 2 is a main switch 14 which is arranged to close the circuit through the conductor 2 when the voltage of the generator 1 has risen to a predetermined value. For this purpose it is operated by a coil 15 connected across the circuit 2, 3, by a conductor 16. A coil 17 also regulates the action of the switch 14 and this coil is connected in series in the conductor 2 and is arranged to aid the coil 15 when current flows therethrough from the generator 1 but acts to open the switch 14 in case any of the batteries should tend to force current back through the generator 1. The dynamo 13 is provided with a field coil 18 having one terminal connected to the positive side of the generator 1 with its other terminal connected to the conductor 2 on the right hand side of the switch 14 by means of wire 19. In series with the wire 19 and field 18 is placed a fixed resistance 20.

21 represents a vibrating armature acted upon by an electromagnet 22 which is provided with windings or coils 23, 24 and 25. The armature 21 is electrically connected with the negative side of the generator 1 by means of a conductor 26 and when attracted by the electromagnet 22 is arranged to contact with the contact terminal 27 which is electrically connected with the negative side of the field coil 18 by means of a conductor 28. A spring 29 normally holds the armature 21 away from the magnet 22.

The coil 23 has one terminal connected to the positive side of the generator 1 while its other terminal is connected with the conductor 4 at its end nearest the train unit A. The coil 24 is connected across the terminals of the loop conductors 3 and 4, and has in series therewith, a variable resistance 30. The coil 25 is connected in shunt to the resistance 31, which resistance is in series with the conductor 3 near the positive terminal of the generator 1.

The operation of the system is as follows. On being started up the generator 1 gradually builds up as a shunt machine. This action is aided by the auxiliary dynamo 13, which at this time is excited, so that it produces a voltage in a direction to aid the field 12. This is due to the fact that the batteries 7 cause a current to flow through the field coil 18 and resistance 20 in a proper direction for this purpose. This action continues until the generator 1 has reached the predetermined voltage at which it is desired that it feed the work circuits and batteries. At this point in the operation the coil 15 causes the switch 14 to close so that the circuit through the conductor 2 is closed and the work circuits and storage batteries are fed from the generator 1. This action also short-circuits the circuit consisting of field 18, conductors 19 and resistance 20. However, if the output of the generator 1 increases above a predetermined value the strength of the coil 25, together with the action of the coils 23 and 24, will be sufficient to cause the armature 21 to be attracted, thus connecting the coil 18 directly across the terminals of the generator 1 and causing a current to flow in the opposite direction therethrough, so that the dynamo 13 becomes a counter machine and tends to greatly decrease the field strength of the main generator. Immediately this action begins to take effect, however, the current through the coil 25 decreases so that the armature 21 is almost immediately released to its former position. As this action continues the armature 21 vibrates back and forth at a sufficient rate to keep the voltage of the generator 1 so that its output is substantially constant irrespective of the rate of its speed. This action is aided by the coil 23 which regulates the action of the armature 21 responsive to voltage changes across the circuit. The coil 24 opposes the action of the coils 23 and 25. It will thus be seen that the coil 23 regulates the action of the armature 21 so as to prevent the generator voltage from rising unduly, while the coil 25 prevents the generator current from rising unduly. In this manner the charging current to the batteries is kept at its proper value, but as the voltage of the batteries rise, due to their becoming charged, the coil 23 becomes more and more effective, so that the coil 25 necessarily becomes less effective, thus gradually cutting down the charging current and giving the batteries a tapering charge. This action continues until the batteries become fully charged and float across the line. In case more train units are added to the system it is proper that the generator voltage rise somewhat, in order to have its output increase and to compensate for the drop in voltage through the conductors due to the extra load placed thereupon. This is obtained by the action of the coil 24 which opposes the action of coils 23 and 25. As more train units and work circuits are added to the system the voltage across the loop conductors 3 and 4 necessarily increases, so that the coil 24 becomes more effective, thereby weakening the magnet 22 and thus allowing the generator voltage to increase sufficiently to compensate more or less for the extra load thrown on. I preferably adjust the action of the coil 24 so that it will not fully compensate for this drop and so that as more and more train units are thrown into the system to be fed by the generator the voltage of the generator will not increase proportionately but a point will be reached where after a certain increase in load the batteries 7 will take part of the extra load. As the voltage would tend to vary at the work circuits, depending on whether they are being fed by the generator or batteries, any change in voltage operates the carbon piles 9 through the solenoids 11 so that the voltage at the work circuits 8 is kept substantially constant in a well known manner. It will be noted that the vibrating regulator or armature 21 operates while the batteries 7 are being charged, in order to regulate the charging current thereon.

From the above it will be apparent that the shunt winding 23 acting alone would tend to maintain a constant potential of, say 85 volts in a system employing 32 cells of battery on each car, this voltage being maintained across the conductors 2 and 4 so that with no lights burning the battery charge would automatically fall off as it approached the fully charged condition. As this coil is connected directly across the conductors 2 and 4, variations in the drop of the loop conductor will not affect the above action. The series coil 25 is responsive in any desired degree to the total machine output, and, therefore, sets a limit to the machine output to any desired value to suit a certain length of train and will maintain this value of output with the lamps or work circuits on or off, subject to reduction, however, as the battery back pressure rises. The third winding 24, acting in an opposing direction, increases the output in any desired proportion to meet the demands of increased load and length of conductors. The two windings 24 and 25 may be given such values that the load will increase in such proportion as train units are added, that, if the train attains such a length as to have a lamp load greater than the capacity of the generator the batteries will be caused to take the overload by discharging, as above explained.

From the above it will be apparent that the system is inherently provided for the control of the generator output to suit the variations in the length of the train or variations in the state of charge of the battery, and this is obtained independently of the characteristics of the machines 1 and 13.

Most of the features above pointed out are extremely advantageous whether the dynamo 1 be driven at a constant speed or at a variable speed.

Although I have described my improvements in great detail I do not desire to be limited thereto except as specified in the claims, since many changes and modifications may be made within the spirit and scope of my invention.

Having fully and clearly described my improvements what I claim as new and desire to secure by Letters Patent, is:

1. In an electrical system of distribution, a generator, a vibratory armature arranged to regulate the voltage of the generator, a plurality of batteries and work circuits arranged to be fed by the generator and a coil arranged to cause the generator voltage to increase as more work circuits are connected to be fed by the generator responsive to variations in the line drop of the system.

2. In an electrical system of distribution, a generator, a plurality of batteries and work circuits arranged to be fed thereby, a counter-machine for regulating the field strength of the generator to regulate the generator voltage, a vibratory armature arranged to regulate the action of said counter-machine, a coil arranged to regulate the action of said armature to maintain the voltage of the generator at a proper value, and a coil arranged to regulate the action of said armature to increase the voltage of the generator when more work circuits are connected to be fed by the generator said last mentioned coil being responsive to variations in the line drop to said work circuits.

3. In an electrical train lighting system, a variable speed generator driven by the movement of the train, a plurality of train units each carrying a battery and work circuit arranged to be fed by the generator, means for regulating the field strength of the generator to regulate its voltage, and a coil for regulating the action of said means to increase the voltage of the generator when more train units are connected to be supplied by the generator said coil being responsive to variations in the line drop to said work circuits.

4. In an electrical train lighting system, a variable speed generator driven by the movement of the train, a plurality of train units each carrying a battery and work circuit arranged to be fed by the generator, a vibratory armature arranged to regulate the field strength of the generator to regulate its voltage, a coil arranged to regulate the action of said armature to maintain the voltage of the generator within proper limits, a loop conductor extending from the generator to the various work circuits and a coil responsive to the voltage drop in said conductor for regulating the action of said armature to increase the voltage of the generator when more work circuits are connected to the generator.

5. In an electrical train lighting system, a variable speed generator driven by the movement of the train, a plurality of train units each carrying a battery and work circuit arranged to be fed by the generator, a loop conductor extending from the generator to the various work circuits, means for regulating the field strength of the generator to regulate its voltage, and a coil for regulating the action of said means to increase the voltage of the generator when more train units are connected to be supplied by the generator, said coil being connected to be responsive to variations in the voltage drop in said loop conductor.

6. In an electrical train lighting system, a variable speed generator driven by the movement of the train, a plurality of train units each carrying a battery and work circuit arranged to be fed by the generator, a vibrating armature arranged to regulate the field strength of the generator to regulate its voltage, a coil arranged to regulate the action of said armature responsive to variations in the generator current, a coil arranged to regulate the action of said armature responsive to voltage variations to limit the voltage of the generator and a coil arranged to regulate the action of said armature to increase the voltage of the generator when more work circuits are connected to be fed by the generator.

7. In an electrical train lighting system, a variable speed generator driven by the movement of the train, a plurality of train units each carrying a battery and work circuit arranged to be fed by the generator, an auxiliary dynamo arranged to regulate the field strength of the generator to regulate its voltage, a vibrating armature switch arranged to vary the action of said dynamo, a loop conductor extending from the generator to the various work circuits and batteries, a coil arranged to regulate the action of said armature to regulate the voltage of the generator and a coil arranged to regulate the action of said armature to increase the voltage of the generator when more train units are added, said last mentioned coil being connected across said loop conductor to be responsive to variations in the voltage drop therein.

8. In an electrical train lighting system, a variable speed generator driven by the movement of the train, a plurality of train units each carrying a battery and work circuit arranged to be fed by the generator, means for regulating the voltage of the generator including a vibrating armature, a coil for varying the action of said armature to regulate the voltage of the generator responsive to current changes, a coil for varying the action of said armature to regulate the voltage of the generator responsive to voltage changes and a third coil for varying the action of said armature to regulate the voltage of the generator responsive to variations in the voltage drop between the generator and work circuits, said armature causing the generator voltage to be maintained at its proper value while the battery is charging.

In testimony whereof, I have signed my name to this specification, in the presence of two subscribing witnesses.

WILLIAM A. TURBAYNE.

Witnesses:
PIERCE W. ENGLISH,
W. H. PATTENDEN.

Copies of this patent may be obtained for five cents each, by addressing the "Commissioner of Patents, Washington, D. C."